US012624209B2

(12) United States Patent
Hartmann-Thompson

(10) Patent No.: US 12,624,209 B2
(45) Date of Patent: May 12, 2026

(54) CURABLE COMPOSITION, REACTION PRODUCT THEREFROM, AND ELECTRONIC ARTICLE INCLUDING THE SAME

(71) Applicant: 3M INNOVATIVE PROPERTIES COMPANY, St. Paul, MN (US)

(72) Inventor: Claire Hartmann-Thompson, Lake Elmo, MN (US)

(73) Assignee: 3M INNOVATIVE PROPERTIES COMPNAY, St. Paul, MN (US)

( * ) Notice: Subject to any disclaimer, the term of this patent is extended or adjusted under 35 U.S.C. 154(b) by 565 days.

(21) Appl. No.: 17/925,794

(22) PCT Filed: May 18, 2021

(86) PCT No.: PCT/IB2021/054286
§ 371 (c)(1),
(2) Date: Nov. 16, 2022

(87) PCT Pub. No.: WO2021/240302
PCT Pub. Date: Dec. 2, 2021

(65) Prior Publication Data
US 2023/0193030 A1 Jun. 22, 2023

Related U.S. Application Data

(60) Provisional application No. 63/031,159, filed on May 28, 2020.

(51) Int. Cl.
*C08L 83/16* (2006.01)
*C08G 77/60* (2006.01)

(52) U.S. Cl.
CPC .............. *C08L 83/16* (2013.01); *C08G 77/60* (2013.01); *B01J 2231/323* (2013.01); *C08L 2203/206* (2013.01); *C08L 2312/08* (2013.01)

(58) Field of Classification Search
CPC ................................. C08G 77/60; C08L 83/16
See application file for complete search history.

(56) References Cited

U.S. PATENT DOCUMENTS

| | | | |
|---|---|---|---|
| 4,510,094 A | 4/1985 | Drahnak | |
| 4,737,552 A * | 4/1988 | Baney | D01F 9/10 |
| | | | 528/31 |

| | | | |
|---|---|---|---|
| 4,916,169 A | 4/1990 | Boardman et al. | |
| 5,145,886 A | 9/1992 | Oxman et al. | |
| 5,260,377 A | 11/1993 | Weber et al. | |
| 6,150,546 A | 11/2000 | Butts | |
| 6,384,172 B1 | 5/2002 | Dvornic et al. | |
| 7,192,795 B2 | 3/2007 | Boardman et al. | |
| 2007/0023880 A1 | 2/2007 | Hess et al. | |
| 2015/0013717 A1 | 1/2015 | Freese et al. | |
| 2015/0252125 A1 | 9/2015 | Moro et al. | |
| 2016/0372704 A1 | 12/2016 | Lee et al. | |
| 2020/0119301 A1 | 4/2020 | Ha et al. | |

FOREIGN PATENT DOCUMENTS

| | | | | |
|---|---|---|---|---|
| CN | 103772710 A | * | 5/2014 | |
| EP | 1661934 A1 | | 5/2006 | |
| WO | 2000068336 A1 | | 11/2000 | |
| WO | 2004111151 A2 | | 12/2004 | |
| WO | 2006003853 A2 | | 1/2006 | |
| WO | 2013/115114 A1 | | 8/2013 | |
| WO | 2019123123 A1 | | 6/2019 | |
| WO | 2020225621 A1 | | 11/2020 | |

OTHER PUBLICATIONS

"Control of Structure Formation of Polycarbosilane Synthesized from Polydimethylsilane by Kumada Rerrangment" authored by Chen et al. and published in the Journal of Applied Polymer Science (2008) 108, 3114-3121.*

Chwang, "Thin Film Encapsulated Flexible Organic Electroluminescent Displays", Applied Physics Letters, May 2003, vol. 83, No. 3, pp. 413-415.

Givot, "Measurements of Powders and Liquids Employing Dielectric Resonator Technique", MIKON 2008—17th International Conference on Microwaves, Radar and Wireless Communications, 2008, pp. 1-4.

Hu, "Hyperbranched Polycarbosiloxanes and Polycarbosilanes via Bimolecular Non-Linear Hydrosilylation Polymerization", Polymer, 2012, vol. 53, pp. 5459-5468.

International Search Report for PCT Application No. PCT/IB2021/054286, mailed on Dec. 22, 2021, 4 pages.

Krupka, "TE01δ Dielectric-Resonator Technique for Precise Measurements of the Complex Permittivity of Lossy Liquids at Frequencies Below 1 GHz*", Conference on Precision Electromagnetic Measurements, Jun. 2004, pp. 469-470.

* cited by examiner

*Primary Examiner* — Marc S Zimmer
(74) *Attorney, Agent, or Firm* — Ann Benjamin

(57) ABSTRACT

A curable composition comprises: at least one aliphatic carbosilane having m Si—H groups, at least one aliphatic carbosilane having n vinyl groups, and at least one hydrosilylation reaction catalyst. m is an integer greater than or equal to 2, n is an integer greater than or equal to 2, and m+n is at least 5. A cured reaction product and an electronic article including the same are also disclosed.

15 Claims, 1 Drawing Sheet

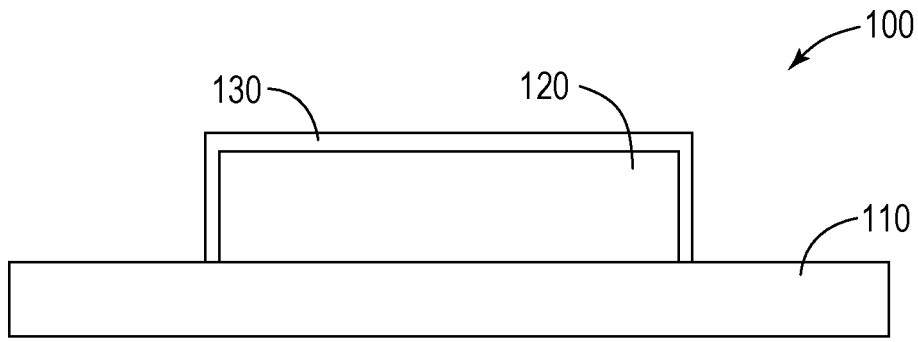

CURABLE COMPOSITION, REACTION PRODUCT THEREFROM, AND ELECTRONIC ARTICLE INCLUDING THE SAME

CROSS-REFERENCE TO RELATED APPLICATIONS

This application is a national stage filing under 35 U.S.C. 371 of PCT/IB2021/054286, filed May 18, 2021, which claims the benefit of U.S. Provisional Application No. 63/031,159, filed May 28, 2020.

TECHNICAL FIELD

The present disclosure broadly relates to curable compositions comprising carbosilanes, their cured reaction products, and electronic devices including the same.

BACKGROUND

Fifth-generation wireless (5G) is the latest iteration of cellular technology, engineered to greatly increase the speed and responsiveness of wireless networks. With 5G, data transmitted over wireless broadband connections can travel at multigigabit speeds, with potential peak speeds as high as 20 gigabits per second (Gbps) by some estimates. The increased speed is achieved partly by using higher frequency radio waves than current cellular networks. However, higher frequency radio waves have a shorter range than the frequencies used by previous networks. So to ensure wide service, 5G networks operate on up to three frequency bands, low, medium, and high. A 5G network will be composed of networks of up to 3 different types of cell, each requiring different antennas, each type giving a different tradeoff of download speed vs. distance and service area. 5G cellphones and wireless devices will connect to the network through the highest speed antenna within range at their location.

Low-band 5G uses a similar frequency range as current 4G cellphones, 600-700 MHz giving download speeds a little higher than 4G: 30-250 megabits per second (Mbit/s). Low-band cell towers will have a similar range and coverage area to current 4G towers. Mid-band 5G uses microwaves of 2.5-3.7 GHz, currently allowing speeds of 100-900 Mbit/s, with each cell tower providing service up to several miles radius. High-band 5G uses frequencies of 25-39 GHz, near the bottom of the millimeter wave band, to achieve download speeds of 1-3 gigabits per second (Gbit/s), comparable to cable internet.

Many materials used in the telecommunication industry today do not perform well at 5G frequencies. Thus, the higher frequencies of 5G necessitate the identification and development of materials that can function at those frequencies and not interfere with proper functioning of electronic devices communicating at high-band wavelengths.

SUMMARY

Advantageously, curable compositions according to the present disclosure may have low viscosity suitable for dispensing using an ink jet printer. Further, curable compositions and their cured reaction products have a low dielectric constant and dielectric loss making them suitable for use in 5G electronic devices such as, for example, cell phones, telecommunications infrastructure, and tablet computers.

In one aspect, the present disclosure provides a curable composition comprising components:
- a) at least one aliphatic carbosilane having m Si—H groups, wherein m is an integer greater than or equal to 2; and
- b) at least one aliphatic carbosilane having n vinyl (i.e., —CH=CH$_2$) groups, wherein n is an integer greater than or equal to 2, wherein m+n is at least 5; and
- c) at least one hydrosilylation reaction catalyst.

Advantageously, curable compositions according to the present disclosure may have low viscosity suitable for dispensing using an ink jet printer.

In another aspect, the present disclosure provides a reaction product of components comprising:
- a) at least one aliphatic carbosilane having m Si—H groups, wherein m is an integer greater than or equal to 2; and
- b) at least one aliphatic carbosilane having n vinyl groups, wherein n is an integer greater than or equal to 2, wherein m+n is at least 5; and
- c) at least one hydrosilation reaction catalyst.

In yet another aspect, the present disclosure provides an article comprising a substrate having an electronic component bonded thereto, wherein the electronic component is in contact with a reaction product according to the present disclosure.

As used herein:

"aliphatic" means free of any aromatic group;

"carbosilane" refers to a compound composed exclusively of Si, C, and H, and having no Si—Si bonds; and "essentially free of" means containing less than 1 percent by weight of (e.g., less than 1 percent by weight of, less than 0.1 percent by weight of, or even less than 0.01 percent by weight of).

Features and advantages of the present disclosure will be further understood upon consideration of the detailed description as well as the appended claims.

BRIEF DESCRIPTION OF THE DRAWINGS

FIG. 1 is a schematic side view of an electronic article 100 according to the present disclosure.

It should be understood that numerous other modifications and embodiments can be devised by those skilled in the art, which fall within the scope and spirit of the principles of the disclosure. The FIGURES may not be drawn to scale.

DETAILED DESCRIPTION

Various aliphatic carbosilanes having m Si—H groups, wherein m is an integer greater than or equal to 2 are known in the art and/or are commercially available. Preferably, these carbosilanes have from 1 to 50 carbon atoms, more preferably, 4 to 18 carbon atoms, and more preferably 6 to 12 carbon atoms, although this is not a requirement. Exemplary values for m include 2, 3, 4, 5, 6, 8, and 10, although other values are also permissible. Of these, m=2, 3, or 4 are typically preferred.

In some embodiments, useful aliphatic carbosilanes having m Si—H groups are represented by the formula:

$$HSi(R^1)_2R^2Si(R^1)_2H$$

Each $R^1$ independently represents an alkyl group having from 1 to 4 carbon atoms (e.g., methyl ethyl, n-propyl, isopropyl, n-butyl, sec-butyl, isobutyl, or tert-butyl).

Each $R^2$ independently represents an alkylene group or a divalent carbosilane group having up to 50 carbon atoms.

Exemplary alkylene (i.e., divalent) groups include methylene, ethylene, propylene, butylene, hexylene, octylene, decylene, hexadecylene, octadecylene, eicosylene, and tricosylene. Of these, ethylene, propylene, and butylene are often preferred. Exemplary divalent carbosilane groups include 3,3-dimethyl-3-silapentan-1,5-diyl and 2,2,4,4,-tetramethyl-2,4-disilapentan-1,5-diyl. Other divalent carbosilane groups are also permissible.

Hydrosilanes may be synthesized by hydride reduction of corresponding chloro- or alkoxysilanes using reactive metal hydrides such as lithium aluminum hydride ($LiAlH_4$), sodium borohydride, and diisobutylaluminum hydride (DIBAL-H), or they may be obtained from commercial sources, for example.

Still other useful aliphatic carbosilanes having m Si—H groups may include dialkyldihydridosilanes such as, for example, dimethylsilane, dipropylsilane, and dibutylsilane.

Aliphatic carbosilanes having at least two vinyl groups (i.e., n≥2) are known in the chemical arts, and are also available from commercial suppliers. Preferably, these carbosilanes have from 1 to 50 carbon atoms, more preferably, 4 to 18 carbon atoms, and more preferably 6 to 12 carbon atoms, although this is not a requirement. Exemplary values for n include 2, 3, 4, 5, 6, 8, and 10, although other values are also permissible. Of these, n=2, 3, or 4 are typically preferred.

Examples include, dimethyldivinylsilane, methyltrivinylsilane, tetravinylsilane, tetraallylsilane, and 1,4-divinyl-1,1,4,4-tetramethyl-1,4-disilabutane.

In some embodiments, the aliphatic carbosilane(s) having at least two vinyl groups are represented by the formula $$Si(R^1)_p(R^3CH{=}CH_2)_q$$

wherein p is 0, 1, or 2, q is 2, 3, or 4, and p+q=4. In this embodiment, $R^1$ is as previously defined and $R^3$ represents a covalent bond or an alkylene group having from 1 to 8 carbon atoms.

In order to form a cured network, not only must m and n be at least two, but the sum of m+n must be at least 5, at least 6, at least 7, at least 8, or more.

Typically, the Si—H:vinyl equivalent ratio of carbosilane component a) to the carbosilane component b) is in the range of 0.7 to 1.5, preferably 0.8 to 1.3, and more preferably 0.9 to 1.2, although this is not a requirement.

Hydrosilylation, also called catalytic hydrosilation, describes the addition of Si—H bonds across unsaturated bonds. The hydrosilylation reaction is typically catalyzed by a platinum catalyst, and generally heat is applied to effect the curing reaction. In this reaction, the Si—H adds across the double bond to form new C—H and Si—C bonds. This process in described, for example, in PCT Publication No. WO 2000/068336 (Ko et al.), and PCT Publication Nos. WO 2004/111151 (Nakamura) and WO 2006/003853 (Nakamura).

Useful hydrosilylation catalysts may include thermal catalysts and/or photocatalysts. Of these, photocatalysts may be preferred due to prolonged storage stability and ease of handling Exemplary thermal catalysts include platinum complexes such as $H_2PtCl_6$ (Speier's catalyst); organometallic platinum complexes such as, for example, a coordination complex of platinum and a divinyldisloxane (Karstedt's catalyst); and chloridotris(triphenylphosphine) rhodium(I) (Wilkinson's catalyst), Useful platinum photocatalysts are disclosed, for example, in U.S. Pat. No. 7,192,795 (Boardman et al.) and references cited therein. Certain preferred platinum photocatalysts are selected from the group consisting of Pt(II)

β-diketonate complexes (such as those disclosed in U.S. Pat. No. 5,145,886 (Oxman et al.)), (η5-cyclopentadienyl)tri(σ-aliphatic)platinum complexes (such as those disclosed in U.S. Pat. No. 4,916,169 (Boardman et al.) and U.S. Pat. No. 4,510,094 (Drahnak)), and C7-20-aromatic substituted (η5-cyclopentadienyl)tri(σ-aliphatic)platinum complexes (such as those disclosed in U.S. Pat. No. 6,150,546 (Butts)). Hydrosilylation photocatalysts are activated by exposure top actinic radiation, typically ultraviolet light, for example, according to known methods.

The amount of hydrosilylation catalyst may be any effective amount. In some embodiments, the amount of hydrosilylation catalyst is in an amount of from about 0.5 to about 30 parts of platinum per one million parts of the curable composition, although greater and lesser amounts may also be used.

Advantageously, curable and cured compositions according to the present disclosure typically have low dielectric constant/dielectric loss at frequencies associated with 5G wireless communication protocols. In some embodiments, the curable and/or cured composition has a dielectric constant of less than or equal to 3 in the presence of an external alternating electric field of 10 gigahertz. In some preferred embodiments, tan delta (also known in the art as the loss tangent, or dissipation factor) is less than 0.002 at 10 GHz.

Further, curable and cured compositions according to the present disclosure may be essentially free of solvent.

Still further, curable compositions according to the present disclosure may have a low viscosity suitable for inkjet printing. For example, in some embodiments, shear viscosity (also termed absolute or dynamic viscosity) of less than or equal to 50 centipoise at a temperature between 21° C. and 50° C. is measured according to ASTM Test Method D7867-13 (Measurement of the Rotational Viscosity of Paints, Inks and Related Liquid Materials as a Function of Temperature).

In many embodiments, it is useful to provide curable compositions according to the present disclosure as two-part compositions that are combined in order to cure. This may provide enhanced storage stability. In such case, the curable composition comprises a Part A and a Part B. In preferred embodiments, Part A comprises the component a) and is free of the component b), and Part B comprises the component b) and the component c) and is free of the component a).

Optional additives may also be present in curable (and cured) compositions according to the present disclosure. Examples may include flow aids, low dielectric fillers (e.g., glass bubbles), and/or surfactants.

Curable and cured compositions according to the present disclosure are useful, for example, as encapsulants, sealants, and/or adhesives for electronic components used in 5G compatible equipment, for example.

The substrate may be plastic, composite, metal, ceramic and/or glass, for example. Exemplary substrates include electronic circuit boards and antennas. Examples of suitable electronic components include display components (e.g., OLED displays and LCDs), and especially electronic components intended for use in the presence of an external alternating electrical field comprising a frequency of at least one gigahertz (1 GHz), preferably in the presence of an external alternating electrical field comprising a frequency of 25 GHz.

Referring now to FIG. 1, electronic article 100 comprises substrate 110 having an electronic display component 120 bonded thereto. Electronic display component 120 is contacted by reaction product 130 according to the present disclosure which forms a seal.

SELECT EMBODIMENTS OF THE PRESENT DISCLOSURE

In a first embodiment, the present disclosure provides a curable composition comprising components:

a) at least one aliphatic carbosilane having m Si—H groups, wherein m is an integer greater than or equal to 2; and b) at least one aliphatic carbosilane having n vinyl groups, wherein n is an integer greater than or equal to 2, wherein m+n is at least 5; and c) at least one hydrosilylation reaction catalyst.

In a second embodiment, the present disclosure provides a curable composition according to the first embodiment, wherein the curable composition has a dielectric constant of less than or equal to 3 and a tan delta of less than 0.002 in the presence of an external alternating electric field of 10 gigahertz.

In a third embodiment, the present disclosure provides a curable composition according to the first or second embodiment, wherein the curable composition has a shear viscosity of less than or equal to 50 centipoise at a temperature between 21° C. and 50° C., inclusive according to ASTM Test Method D7867-13 (Measurement of the Rotational Viscosity of Paints, Inks and Related Liquid Materials as a Function of Temperature).

In a fourth embodiment, the present disclosure provides a curable composition according to any of the first to third embodiments, wherein the curable composition is essentially free of solvent.

In a fifth embodiment, the present disclosure provides a curable composition according to any of the first to fourth embodiments, wherein m is at least 3.

In a sixth embodiment, the present disclosure provides a curable composition according to any of the first to fifth embodiments, wherein n is at least 3.

In a seventh embodiment, the present disclosure provides a curable composition according to any of the first to sixth embodiments, wherein the at least one hydrosilylation reaction catalyst comprises an organometallic platinum complex.

In an eighth embodiment, the present disclosure provides a curable composition according to any of the first to seventh embodiments, wherein the at least one aliphatic carbosilane having m Si—H groups is represented by the formula:

$$HSi(R^1)_2R^2Si(R^1)_2H$$

wherein:

each $R^1$ independently represents an alkyl group having from 1 to 4 carbon atoms; and each $R^2$ independently represents an alkylene group or a divalent carbosilane group having up to 50 carbon atoms.

In a ninth embodiment, the present disclosure provides a curable composition according to any of the first to eighth embodiments, wherein the at least one aliphatic carbosilane having n vinyl groups is represented by the formula:

$$Si(R^1)_p(R^3CH{=}CH_2)_q$$

wherein:

each $R^1$ independently represents an alkyl group having from 1 to 4 carbon atoms;

each $R^3$ independently represents an alkylene group having from 1 to 8 carbon atoms, or a covalent bond;

p represents an integer from 0 to 2; and q represents an integer of 2 to 4, wherein p+q=4.

In a tenth embodiment, the present disclosure provides a curable composition according to any of the first to ninth embodiments, wherein the curable composition comprises a Part A and a Part B, wherein Part A comprises the component a) and is free of the component b), and Part B comprises the component b) and the component c) and is free of the component a).

In an eleventh embodiment, the present disclosure provides a reaction product of components comprising:

a) at least one aliphatic carbosilane having m Si—H groups, wherein m is an integer greater than or equal to 2; and b) at least one aliphatic carbosilane having n vinyl groups, wherein n is an integer greater than or equal to 2, wherein m+n is at least 5; and c) at least one hydrosilation reaction catalyst.

In a twelfth embodiment, the present disclosure provides a reaction product according to the eleventh embodiment, wherein the curable composition has a dielectric constant of less than or equal to 3 and a tan delta of less than 0.002 in the presence of an external alternating electric field of 10 gigahertz.

In a thirteenth embodiment, the present disclosure provides a reaction product according to the eleventh or twelfth embodiment, wherein the reaction product is essentially free of solvent.

In a fourteenth embodiment, the present disclosure provides a reaction product according to any of the eleventh to thirteenth embodiments, wherein m is at least 3.

In a fifteenth embodiment, the present disclosure provides a reaction product according to any of the eleventh to fourteenth embodiments, wherein n is at least 3.

In a sixteenth embodiment, the present disclosure provides a reaction product according to any of the eleventh to fifteenth embodiments, wherein the at least one hydrosilation reaction catalyst comprises an organometallic platinum complex.

In a seventeenth embodiment, the present disclosure provides a reaction product according to any of the eleventh to sixteenth embodiments, wherein the at least one aliphatic carbosilane having m Si—H groups is represented by the formula:

$$HSi(R^1)_2R^2Si(R^1)_2H$$

wherein:

each $R^1$ independently represents an alkyl group having from 1 to 4 carbon atoms; and each $R^2$ independently represents an alkylene group or a divalent carbosilane group having up to 50 carbon atoms.

In an eighteenth embodiment, the present disclosure provides a reaction product according to any of the eleventh to seventeenth embodiments, wherein the at least one aliphatic carbosilane having n vinyl groups is represented by the formula:

$$Si(R^1)_p(R^3CH{=}CH_2)_q$$

wherein:

each $R^1$ independently represents an alkyl group having from 1 to 4 carbon atoms;

each $R^3$ independently represents an alkylene group having from 1 to 8 carbon atoms, or a covalent bond;

p represents an integer from 0 to 2; and q represents an integer of 2 to 4, wherein p+q=4.

In a nineteenth embodiment, the present disclosure provides an electronic article comprising a substrate having an electronic component bonded thereto, wherein the electronic component is in contact with the reaction product of any of the eleventh to eighteenth embodiments.

In a twentieth embodiment, the present disclosure provides an electronic article according to the nineteenth embodiment, wherein the electronic component is intended for use in the presence of an external alternating electrical field comprising a frequency of at least one gigahertz.

In a twenty-first embodiment, the present disclosure provides an electronic article according to the nineteenth or twentieth embodiment, wherein the electronic component is intended for use in the presence of an external alternating electrical field comprising a frequency of at least 25 GHz.

In a twenty-second embodiment, the present disclosure provides an electronic article according to any of the nineteenth to twenty-first embodiments, wherein the reaction product has a dielectric constant of less than or equal to 3 and a tan delta of less than 0.002 in the presence of an external alternating electric field of 10 gigahertz.

In a twenty-third embodiment, the present disclosure provides an electronic article according to any of the nineteenth to twenty-second embodiments, wherein the reaction product functions as a sealant for the electronic component.

In a twenty-fourth embodiment, the present disclosure provides an electronic article according to any of the nineteenth to twenty-third embodiments, wherein the electronic component comprises an electronic display component.

In a twenty-fifth embodiment, the present disclosure provides an electronic article according to the twenty-fourth embodiment, wherein the electronic display component comprises an organic light emitting diode.

In a twenty-sixth embodiment, the present disclosure provides an electronic article according to any of the nineteenth to twenty-fifth embodiments, wherein the reaction product functions as an adhesive to bond the electronic component to the substrate.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Table 1, below, lists materials used in the examples.

TABLE 1

| MATERIAL | ABBRE-VIATION | SOURCE |
|---|---|---|
| 1,1,4,4-Tetramethyl-1,4-disilabutane | TMDSB | Gelest, Inc., Morrisville, Pennsylvania |
| Tetravinylsilane, 95% | TVS | Gelest, Inc. |
| Platinum divinyltetramethyldisiloxane complex (3 wt. % in vinyl-terminated PDMS) | — | Gelest, Inc. |
| Platinum divinyltetramethyldisiloxane complex (2.1-2, 4 wt. % in xylene) | — | Gelest, Inc. |
| Platinum(II) acetylacetonate, 97% | Pt acac | MilliporeSigma, Saint Louis, Missouri |
| 1,7-Octadiene | — | MilliporeSigma |
| Vinyl-terminated polydimethylsiloxane | — | DMS V-31 from Gelest, Inc. |

TABLE 1-continued

| MATERIAL | ABBRE-VIATION | SOURCE |
|---|---|---|
| Ceramic-filled PTFE composite RO3003 | — | Rogers Corporation, Chandler, Arizona |
| Silicone film | SFilm | high-precision silicone film made from cross-linked silicone rubber, obtained from Wacker as Elastocil Film 2030 |
| Methacryloxy-terminated polydimethylsiloxane (4-6 cps) | MTS-4 | Gelest, Inc. |
| Methacryloxy-terminated polydimethylsiloxane (8-14 cps) | MTS-8 | Gelest, Inc. |

Preparation of Linear Polycarbosilane Polymer (LIN-PCS-Vinyl)

1,1,4,4-Tetramethyl-1,4-disilabutane (14.8 g, 0.1 mol) was added dropwise to a solution of 1,7-octadiene (12.2 g, 0.11 mol) and platinum divinyltetramethyldisiloxane complex (1 drop, 2.1-2.4% Pt in xylene) in toluene (40 mL). After an initial exotherm, the reaction mixture was stirred at room temperature for 3 days, and toluene and excess monomer was removed in vacuo to give the product as a viscous liquid.

Preparation of Hyperbranched Polycarbosilane (HB-PCS-vinyl)

1,1,4,4-Tetramethyl-1,4-disilabutane (8.81 g, 0.0602 mol) was added dropwise to a solution of tetravinylsilane (12.7 g, 0.093 mol, 3.1 molar excess of vinyl) and platinum divinyltetramethyldisiloxane complex (1 drop, 2.1-2.4% Pt in xylene) in toluene (80 mL). After an initial exotherm, the reaction mixture was stirred at room temperature for 3 days, and toluene and excess monomer was removed in vacuo to give the product as a viscous liquid.

Dielectric Spectroscopy for Liquids at 100 kHz-1 MHz

Dielectric property and electrical conductivity measurements on liquids were performed with an Alpha-A High Temperature Broadband Dielectric Spectrometer modular measurement system from Novocontrol Technologies GmbH (Montabaur, Germany). A Keysight Model 16452A liquid dielectric test fixture was used to contain the liquid as a parallel plate capacitor. A ZG2 extension test interface for the Alpha-A modular measurement system was used to allow automated impedance measurements of the Keysight Model 16452A liquid dielectric test fixture through the Novocontrol software. The dielectric constants were computed from ratio of the capacitance of the test cell with liquid to the capacitance of the test cell with air. In order to measure the higher viscosity liquids with the 16452A test cell, the liquid was first heated to 50-55° C. and held at this temperature for 15-30 minutes. The liquid was next injected into the liquid test cell with a syringe. After injection, the liquid was allowed to settle for up to 30 minutes, in order to minimize and avoid formation of air bubbles. After 30 minutes settling, the sample was tested.

Split Post Dielectric Resonator Measurements for Solids at 9.5 GHz

Split-post dielectric resonator measurements were performed in accordance with the standard IEC 61189-2-721 at a frequency of 9.5 GHz. Each thin material or film was inserted between two fixed dielectric resonators. The effect of the specimen upon the resonance frequency and quality factor of the posts enables the direct computation of complex permittivity (dielectric constant and dielectric loss). The 9.5 GHz resonator operates with the $TE_{01\delta}$ mode which has only an azimuthal electric field component so that the electric field remains continuous on the dielectric interfaces. The split post dielectric resonator measures the permittivity component in the plane of the specimen. Loop coupling (critically coupled) was used in each of these dielectric resonator measurements. This 9.5 GHz Split Post Resonator measurement system was combined with Keysight VNA (Vector Network Analyzer Model PNA 8364C 10 MHz-50 GHz). Computations were performed to determine the complex electric permittivity of each specimen at 9.5 GHz.

Cylindrical Dielectric Resonator Measurements for Liquids at 2.5 GHz

A $TE_{01\delta}$ mode cylindrical dielectric resonator was used to measure the complex permittivity of dielectrics at a frequency 2.45 GHz using the method described in J. Krupka, K. Derzakowski, M. D. Janezic, and J. Baker-Jarvis, "TE01delta dielectric resonator technique for precise measurements of the complex permittivity of lossy liquids at frequencies below 1 GHz", Conference on Precision Electromagnetic Measurements Digest, pp. 469-470, London, 27 Jun.-2 Jul. 2004.

Dielectric Constants of Formulation Components

The dielectric constants of linear polycarbosilane and hyperbranched polycarbosilane fluids were measured at 20° C. at frequencies of 100 kHz, 1 MHz, and 2.5 GHz, and compared with silicone fluids, SFilm and a commercial PTFE 5G material. Results are reported in Table 2, below.

TABLE 2

| MATERIAL | DIELECTRIC CONSTANT (20° C.) | | | TAN δ |
| | 100 kHz | 1 MHz | Various GHz | (20° C.) |
| --- | --- | --- | --- | --- |
| Ceramic-filled PTFE composite | — | — | 3.0 (10 GHz) | 0.0013 (10 GHz) |
| LIN-PCS-vinyl | 2.30 | 2.30 | 2.29 (2.5 GHz) | 0.0018 (2.5 GHz) |
| HB-PCS-vinyl | 2.29 | 2.29 | 2.29 (2.5 GHz) | 0.0019 (2.5 GHz) |
| SFilm | — | — | 2.95 (9.5 GHz) | 0.02 (9.5 GHz) |
| Silicone fluid | — | — | 2.76 (2.5 GHz) | 0.0107 (2.5 GHz) |
| MTS-8 | — | — | 3.2 (2.5 GHz) | 0.083 (2.5 GHz) |
| MTS-4 | — | — | 3.7 (2.5 GHz) | 0.203 (2.5 GHz) |

Shear Viscosity of Formulation Components

Rheological measurements were conducted according to ASTM Test Method D7867-13 (Measurement of the Rotational Viscosity of Paints, Inks and Related Liquid Materials as a Function of Temperature) on an ARES G2 strain controlled rheometer (TA Instruments, New Castle, DE, USA) using a recessed concentric cylinder geometry (bob of 25 mm dia./32 mm length; cup w/27 mm dia.). The measurements were collected at 25° C. and 50° C. under nitrogen atmosphere. Measurements of shear viscosity in centipoise (cps) were obtained at a shear rate of 10 s$^{-1}$.

Preparative Examples PE1-PE6

100% solids/solventless formulations (as reported in Table 3) were UV-cured by platinum-catalyzed hydrosilylation under various conditions to give hard polycarbosilane coatings. The formulations had a silane component with SiH functionality (TMDSB) and a component with vinyl functionality (TVS or HB-PCS-vinyl). HB-PCS vinyl was a hyperbranched polycarbosilane with 8.16 mmol/g terminal vinyl content, $M_n$=3100 g/mole, $M_w$=7100 g/mole, polydispersity 2.3, and $T_g$=−68° C. The SiH groups were in molar excess to the vinyl groups (0.1 to 4-fold).

TABLE 3

| EXAMPLE | TMDSB | TVS | HB-PCS-vinyl |
| --- | --- | --- | --- |
| PE1 | 70 | 30 | — |
| PE2 | 60 | 40 | — |
| PE3 | 50 | 50 | — |
| PE4 | 70 | — | 30 |
| PE5 | 60 | — | 40 |
| PE6 | 50 | — | 50 |

Examples E1-E6

PE1 to PE3 were cured at room temperature using 0.3 wt. % platinum(II) acetylacetonate (Pt acac). Samples were prepared by depositing 0.25 mL of formulation onto a glass microscope slide via pipette, and curing using a Clearstone CF1000 UV LED system (395 nm, 100% intensity corresponding to 319 mW/cm$^2$ for one minute at a distance of 1 cm from the surface of the sample). Thicknesses of coatings after cure were measured to be in the range 140-150 micron via a digital micrometer. PE4 to PE6 were cured at 395 nm/100% intensity for 5 minutes using 0.2 wt. % Pt acac.

Examples E7-E12

PE1 to PE6 were cured by adding platinum divinyltetramethyldisiloxane complex (Karstedt's catalyst) at 0.3 wt. %.

Viscosities of Formulation Components

Viscosities of formulations were measured (Table 4) in order to demonstrate that the formulations were potentially inkjet-printable.

TABLE 4

| FORMULATION | SHEAR VISCOSITY, centipoise |
| --- | --- |
| E1 | <20 |
| E2 | <20 |
| E3 | <20 |

The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising components:

a) at least one aliphatic carbosilane having m Si—H groups, wherein m is an integer greater than or equal to 3, wherein the at least one aliphatic carbosilane having m Si—H groups is represented by the formula:

$$HSi(R^1)_2R^2Si(R^1)_2H$$

wherein:

each $R^1$ independently represents an alkyl group having from 1 to 4 carbon atoms; and each $R^2$ independently represents an alkylene group or a divalent carbosilane group having up to 50 carbon atoms;

b) at least one aliphatic carbosilane having n vinyl groups, wherein n is an integer greater than or equal to 2, wherein m+n is at least 5; and c) at least one hydrosilylation reaction catalyst.

2. The curable composition of claim 1, wherein the curable composition has a dielectric constant of less than or equal to 3 and a tan delta of less than 0.002 in the presence of an external alternating electric field of 10 gigahertz.

3. The curable composition of claim 1, wherein the curable composition has a shear viscosity of less than or equal to 50 centipoise at a temperature between 21° C. and 50° C., inclusive according to ASTM Test Method D7867-13 (Measurement of the Rotational Viscosity of Paints, Inks and Related Liquid Materials as a Function of Temperature).

4. The curable composition of claim 1, wherein n is at least 3.

5. The curable composition of claim 1, wherein the at least one hydrosilylation reaction catalyst comprises an organometallic platinum complex.

6. The curable composition of claim 1, wherein the at least one aliphatic carbosilane having n vinyl groups is represented by the formula:

$$Si(R^1)p(R^3CH{=}CH^2)q$$

wherein:

each $R^1$ independently represents an alkyl group having from 1 to 4 carbon atoms;

each $R^3$ independently represents an alkylene group having from 1 to 8 carbon atoms, or a covalent bond;

p represents an integer from 0 to 2; and q represents an integer of 2 to 4, wherein p+q=4.

7. The curable composition of claim 1, wherein the curable composition comprises a Part A and a Part B, wherein Part A comprises the component a) and is free of the component b), and Part B comprises the component b) and the component c) and is free of the component a).

8. A reaction product of components comprising:

a) at least one aliphatic carbosilane having m Si—H groups, wherein m is an integer greater than or equal to 3, wherein the at least one aliphatic carbosilane having m Si—H groups is represented by the formula:

$$HSi(R^1)_2R^2Si(R^1)_2H$$

wherein:

each $R^1$ independently represents an alkyl group having from 1 to 4 carbon atoms; and each $R^2$ independently represents an alkylene group or a divalent carbosilane group having up to 50 carbon atoms;

b) at least one aliphatic carbosilane having n vinyl groups, wherein n is an integer greater than or equal to 2, wherein m+n is at least 5; and c) at least one hydrosilation reaction catalyst.

9. The reaction product of claim 8, wherein the reaction product has a dielectric constant of less than or equal to 3 and a tan delta of less than 0.002 in the presence of an external alternating electric field of 10 gigahertz.

10. The reaction product of claim 8, wherein n is at least 3.

11. The reaction product of claim 8, wherein the at least one hydrosilation reaction catalyst comprises an organometallic platinum complex.

12. The reaction product of claim 8, wherein the at least one aliphatic carbosilane having n vinyl groups is represented by the formula:

$$Si(R^1)p(R^3CH{=}CH^2)q$$

wherein:

each $R^1$ independently represents an alkyl group having from 1 to 4 carbon atoms;

each $R^3$ independently represents an alkylene group having from 1 to 8 carbon atoms, or a covalent bond;

p represents an integer from 0 to 2; and q represents an integer of 2 to 4, wherein p+q=4.

13. An electronic article comprising a substrate having an electronic component bonded thereto, wherein the electronic component is in contact with the reaction product of claim 8.

14. The electronic article of claim 13, wherein the reaction product has a dielectric constant of less than or equal to 3 and a tan delta of less than 0.002 in the presence of an external alternating electric field of 10 gigahertz.

15. The electronic article of claim 13, wherein the electronic component comprises an electronic display component.

* * * * *